(12) United States Patent
Kurita et al.

(10) Patent No.: US 7,911,738 B2
(45) Date of Patent: Mar. 22, 2011

(54) MAGNETIC HEAD SLIDER WITH RESISTIVE HEATING FILM MEANDERING IN STACKING DIRECTION

(75) Inventors: Masayuki Kurita, Kanagawa (JP); Toshiya Shiramatsu, Kanagawa (JP); Masanori Tanabe, Kanagawa (JP); Takayoshi Ohtsu, Kanagawa (JP)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 997 days.

(21) Appl. No.: 11/788,511

(22) Filed: Apr. 19, 2007

(65) Prior Publication Data

US 2007/0247758 A1 Oct. 25, 2007

(30) Foreign Application Priority Data

Apr. 19, 2006 (JP) .................................. 2006-115451

(51) Int. Cl.
*G11B 5/31* (2006.01)
*G11B 5/60* (2006.01)
*G11B 5/56* (2006.01)
*G11B 5/39* (2006.01)

(52) U.S. Cl. ............. 360/125.74; 360/234.4; 360/294.7; 360/317; 360/128

(58) Field of Classification Search ............. 360/125.31, 360/125.74, 234.4, 313, 317, 318, 128, 294.7
See application file for complete search history.

(56) References Cited

U.S. PATENT DOCUMENTS

| 5,991,113 | A  | * | 11/1999 | Meyer et al. ............... 360/234.7 |
| 7,095,587 | B2 |   | 8/2006  | Kurita et al. |
| 2003/0099054 | A1 | * | 5/2003 | Kamijima .................... 360/59 |
| 2003/0174430 | A1 | * | 9/2003 | Takahashi et al. ............ 360/75 |
| 2005/0094316 | A1 |   | 5/2005 | Shiramatsu et al. |
| 2007/0188919 | A1 | * | 8/2007 | Kobayashi .................... 360/126 |

FOREIGN PATENT DOCUMENTS

| JP | 2005-056447 | 3/2005 |
| JP | 2005-135501 | 5/2005 |

* cited by examiner

*Primary Examiner* — Craig A. Renner
(74) *Attorney, Agent, or Firm* — Mahamedi Paradice Kreisman LLP; Christopher J. Brokaw (57) ABSTRACT

According to embodiments of the present invention, a magnetic head slider provided with a heater disposed near a read element to adjust flying height, is required to increase a thermal protrusion by heat generated by the heater without increasing a thermal protrusion attributable to heat generated by a recording current or environmental temperature. A magnetic head slider includes a thin-film head unit including a read element, a heater having a thin heating line extended above and below the read element, a write element, and an insulating layer of alumina ($Al_2O_3$) or the like insulating those components. The thin heating line of the heater is formed from a thin resistive film of NiCr or the like. The thin heating line of the heater is extended above and below the read element so as to meander in a zigzag shape in a direction perpendicular to the device forming surface. The thin heating line has a thickness between about 0.1 and 0.2 μm, a width between about 1 and 3 μm, a length of about 100 μm, and a resistance between about 50 and 500 Ω.

13 Claims, 12 Drawing Sheets

PRIOR ART

Fig. 13

PRIOR ART

MAGNETIC HEAD SLIDER WITH RESISTIVE HEATING FILM MEANDERING IN STACKING DIRECTION

CROSS-REFERENCE TO RELATED APPLICATION

The instant nonprovisional patent application claims priority to Japanese Patent Application No. 2006-115451, filed Apr. 19, 2006 and incorporated by reference in its entirety herein for all purposes.

BACKGROUND OF THE INVENTION

A magnetic disk drive includes a rotatory magnetic disk, and a magnetic head slider supported by a magnetic head support mechanism and capable of being positioned with respect to a direction parallel to a diameter of the magnetic disk. The magnetic head slider is moved relative to the magnetic disk in a plane above the magnetic disk to write/read magnetic information to/from the magnetic disk. The magnetic head slider is caused to fly over the magnetic disk by the wedge effect of an air film serving as a pneumatic bearing so that the magnetic head slider may not directly come into solid-contact with the magnetic disk. Increasing linear recording density by reducing the distance between the magnetic head slider and the magnetic disk, namely, the reduction of the flying height of the slider, is effective in enhancing the high-density recording capability of the magnetic disk drive, and increasing the capacity of the magnetic disk drive or reducing the size of the magnetic disk drive.

A designed flying height is determined allowing for a flying height reduction that may be caused by machining errors and variations of atmospheric pressure and temperature in the working environment. Thus a designed flying height includes a flying height margin to ensure that the magnetic head slider never comes into contact with the magnetic disk even under the worst condition. The flying height margin can be omitted, contact between the magnetic head slider and the magnetic disk can be prevented and the flying height of the write/read element can be greatly reduced if the magnetic head slider has a function to adjust flying height for each magnetic head according to the condition of the working environment.

Figure 12:
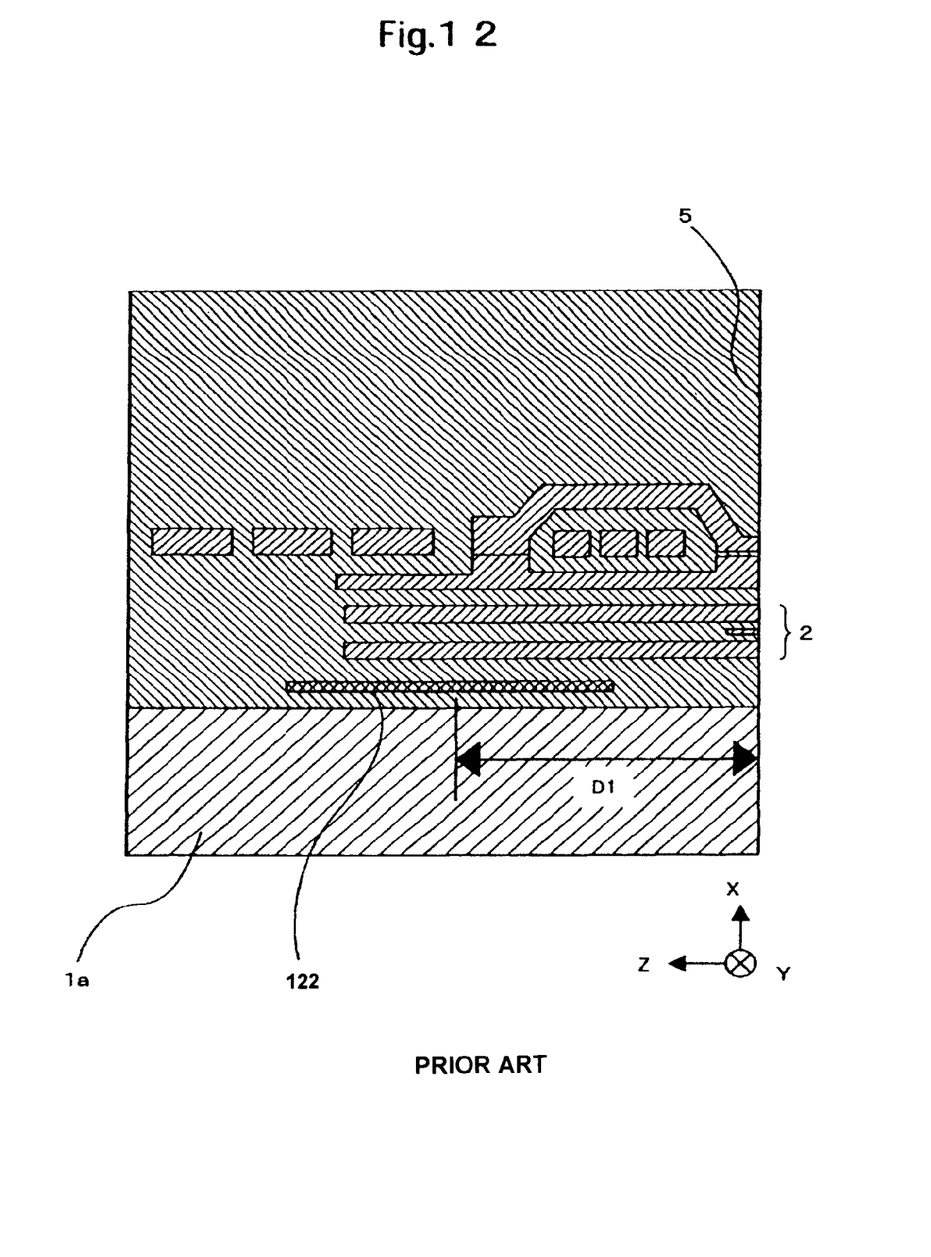
FIG. 12 is a sectional view of a thin-film head unit included in a known magnetic head slider.
Figure 13:
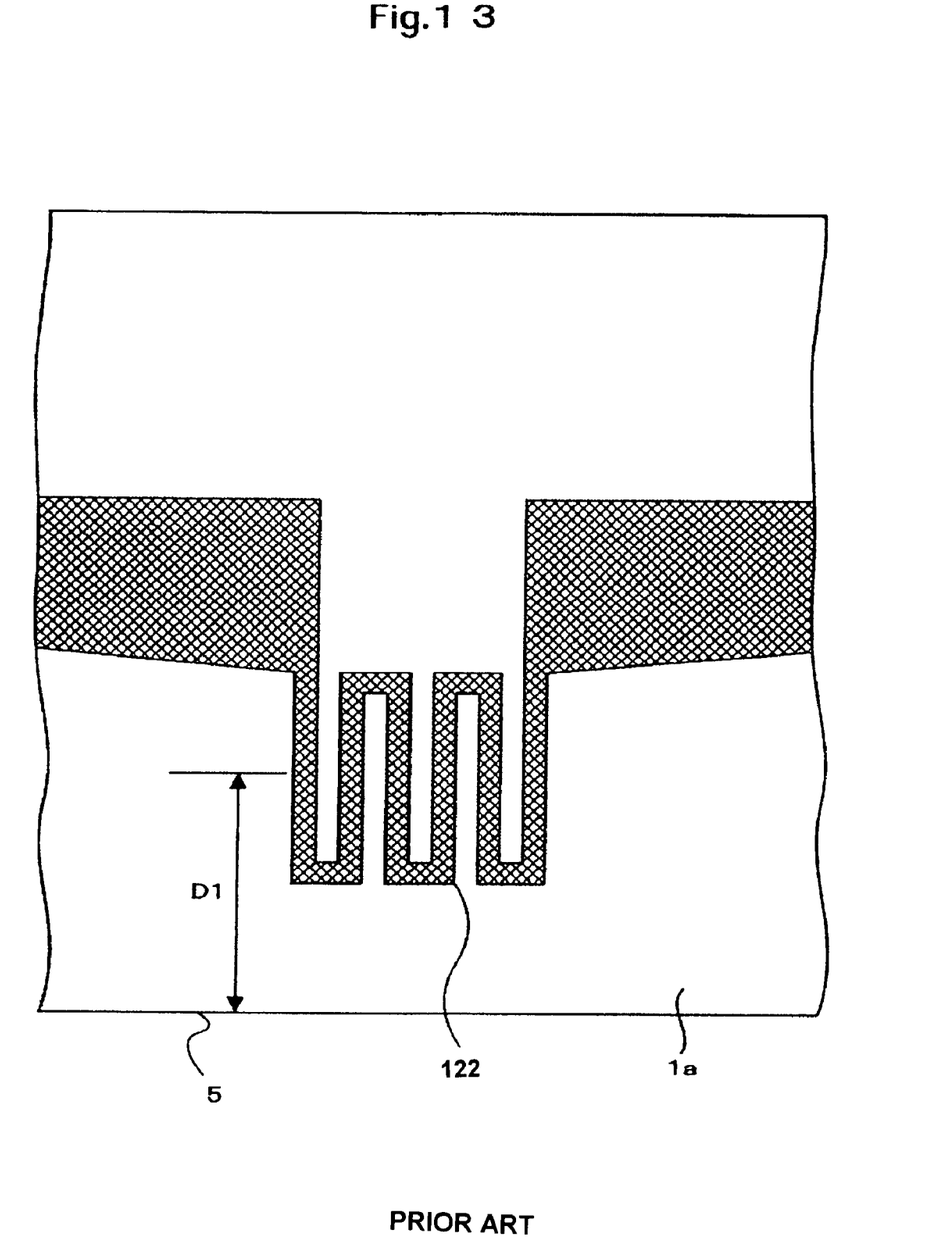
FIG. 13 is a plan view of a heater included in the known magnetic head slider.

A slider structure proposed in Japanese Unexamined Patent Publication No. 2005-135501 ("Patent document 1") includes a heater held between a slider base and a read element to heat a part of a thin film head when necessary such that the thin film head undergoes thermal expansion and juts out to adjust the distance between a magnetic recording medium, and the read element and a write element. FIG. 12 is a sectional view of the thin film head of a magnetic head slider mentioned in Patent document 1. A heater 122 is disposed between a slider base 1a and a read element 2. FIG. 13 is a plan view of the heater 122. The heater 122 is formed by extending a thin heating line of a thin resistive film in a zigzag shape parallel to the slider base 1a.

A slider structure proposed in Japanese Unexamined Patent Publication No. 2005-056447 ("Patent document 2") includes a protruding part formed by surrounding a heater and a write/read element by a soft resin film.

High power consumption is a problem in a magnetic head slider capable of flying height adjustment. A magnetic disk drive to be incorporated into a portable device, in particular, is subject to a severe restriction on power consumption. Whereas a piezoelectric actuator and an electrostatic actuator do not consume power for maintaining a flying height, a thermal actuator using a heater needs power for adjusting the flying height of the slider while the magnetic disk drive is in operation. Therefore, the power consumption of the magnetic disk drive needs to be reduced through the development of a thermal actuator capable of efficiently converting power into the deformation (projection) of the protruding part.

A method of suppressing the conduction of heat generated by the heater to the slider base by forming a thick insulating film on the slider base, and a method of increasing the thermal deformation by surrounding the heater by a soft resin film as mentioned in Patent document 2, are effective in increasing the projection caused by heat generated by the heater.

However, the thick insulating film impedes the dissipation of heat generated by recording current to the slider base. Consequently, thermal protrusion caused by recording current increases. The thermal protrusion caused by recording current is a protrusion resulting from thermal expansion on the order of nanometers caused by heating parts around the write/read element of the head by the sum of heat (iron loss) generated in the magnetic pole by eddy current produced by electromagnetic induction caused by the recording current flowing through a coil, and heat (copper loss) generated by the recording current flowing through the coil. A designed flying height of the slider is determined allowing for a flying height reduction that may be caused by machining errors and variations of atmospheric pressure and temperature in the working environment and includes a flying height margin to ensure that the magnetic head slider never comes into contact with the magnetic disk even under the worst condition. Accordingly, the thermal protrusion attributable to the recording current must be reduced to the least possible extent. Therefore, the insulating film is formed in the thinnest possible design thickness to promote the dissipation of the heat generated by the recording current to the slider base. However, the thin insulating film facilitates the dissipation of heat generated by the heater to the slider base and reduces thermal protrusion caused by the heat generated by the heater. Consequently, power consumption necessary for flying height adjustment increases accordingly.

The method of forming the soft resin film around the heater facilitates the deformation of parts in the vicinity of the resin film. Therefore, the thermal projection caused by a thermal actuator increases and, at the same time, the thermal projection caused by the recording current and the environmental temperature increases. The thermal protrusion caused by the environmental temperature is attributable to difference in the coefficient of linear thermal expansion among metal and resin materials forming the magnetic shield of the write/read element and the magnetic poles, and ceramic materials forming other parts. The thermal protrusion is a local thermal protrusion on the order of nanometers caused by increase in the environmental temperature.

Therefore, there has been demand for a heating structure capable of increasing a thermal protrusion caused by a thermal actuator without increasing a thermal protrusion caused by the recording current and environmental temperature. If a thermal protrusion is increased simply by thermal deformation, the protrusion produces an additional air pressure which increases the flying height of the slider and hence stroke cannot be increased as much as desired. Therefore, it is desired that a sharpest possible thermal protrusion is formed.

BRIEF SUMMARY OF THE INVENTION

According to embodiments of the present invention, a magnetic head slider provided with a heater disposed near a read element to adjust flying height, is required to increase a thermal protrusion by heat generated by the heater without increasing a thermal protrusion attributable to heat generated by a recording current or environmental temperature. As described in specific embodiment shown in FIG. 1, magnetic head slider 1 includes a thin-film head unit 1b including a read element 2, a heater 50 having a thin heating line extended above and below the read element 2, a write element 3 and an insulating layer 60 of alumina ($Al_2O_3$) or the like insulating those components. The thin heating line of the heater 50 is formed from a thin resistive film of NiCr or the like. The thin heating line of the heater 50 is extended above and below the read element 2 so as to meander in a zigzag shape in a direction perpendicular to the device forming surface 1c. The thin heating line has a thickness between about 0.1 and 0.2 μm, a width between about 1 and 3 μm, a length of about 100 μm, and a resistance between about 50 and 500 Ω.

DETAILED DESCRIPTION OF THE INVENTION

Embodiments in accordance with the present invention relate to a magnetic head slider and head gimbals assembly for a magnetic disk drive capable of achieving high-density recording. More particularly, embodiments of the present invention relate to a magnetic head slider and head gimbals assembly capable of adjusting the distance between a magnetic disk and a magnetic head.

One object of embodiments in accordance with the present invention to provide a magnetic head slider in which a large thermal protrusion is formed by heat generated by a heater and a small thermal protrusion is formed by heat generated by a recording current.

Another object of embodiments of the present invention is to provide a magnetic head slider whose flying height is increased slightly by a thermal protrusion.

A third object of embodiments of the present invention is to provide a head gimbals assembly for holding a magnetic head slider in which a large thermal protrusion is formed by heat generated by a heater and a small thermal protrusion is formed by heat generated by a recording current.

An embodiment of a magnetic head slider according to the present invention includes: a slider; a read element formed on a device forming surface of the slider; a write element formed on the read element; and a heater formed near the read element and having a thin heating line of a thin resistive film meandering in a zigzag shape in a direction in which the write element is stacked.

Desirably, the thin heating line of the thin resistive film extends above and below the read element.

The heater may be formed between the device forming surface of the slider and the read element.

The heater may be formed between the read element and the write element.

An embodiment of a head gimbals assembly according to the present invention includes: a magnetic head slider; a flexible gimbals holding the magnetic head slider; and a loading beam supporting the gimbals and loading the magnetic head slider; wherein the magnetic head slider includes: a slider, a read element formed on a device forming surface of the slider, a write element formed on the read element, and a heater formed near the read element and having a thin heating line of a thin resistive film meandering in a zigzag shape in a direction in which the write element is stacked.

An embodiment of a magnetic head slider according to the present invention having a flying height adjusting function is capable of forming a large protrusion by heat generated by the heater, or suppressing the formation of a large protrusion by heat generated by recording current and of suppressing the increase of the flying height of the slider by the thermal protrusion.

A magnetic head slider and a head gimbals assembly according to embodiments of the present invention will be described with reference to the accompanying drawings, in which the same reference characters designate the same or like component parts.

Figure 2:
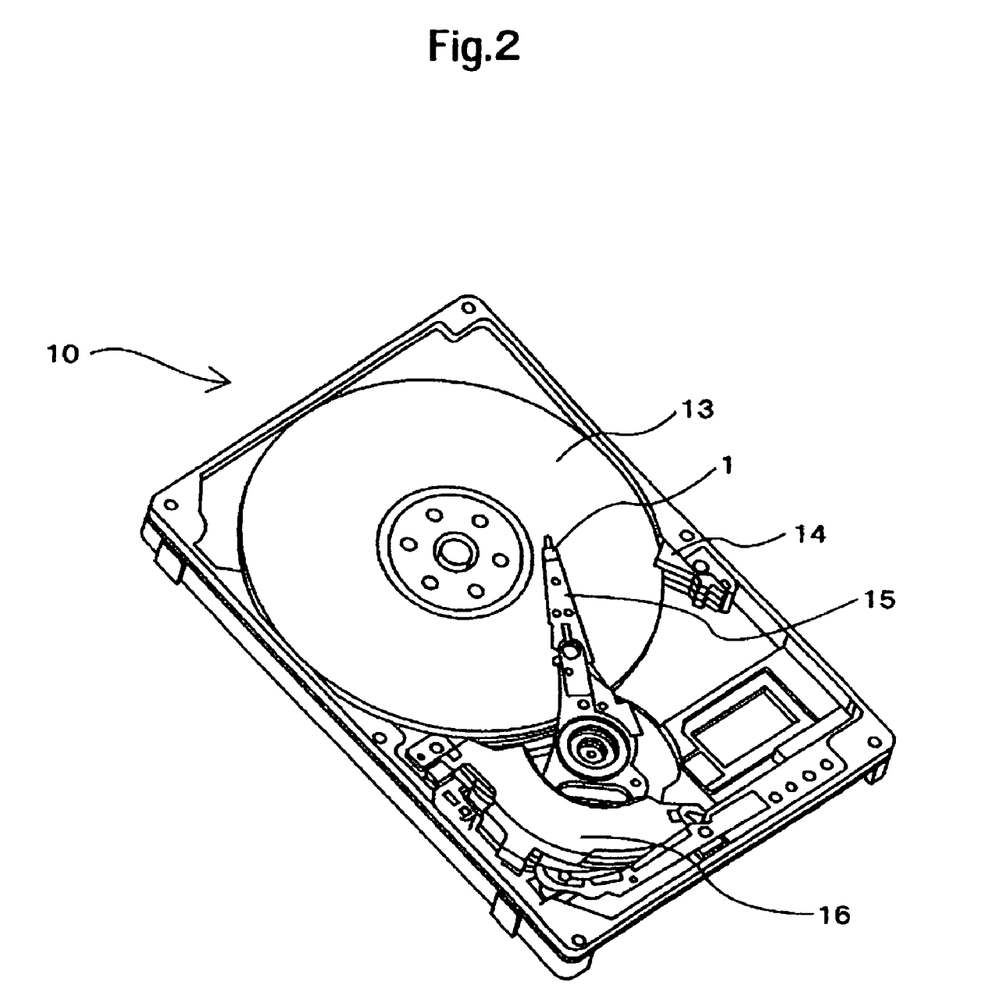
FIG. 2 is a top view of a magnetic disk drive provided with a magnetic head slider according to an embodiment of the present invention.

A magnetic disk drive provided with a magnetic head slider according to embodiments of the present invention will be described with reference to FIG. 2. A magnetic disk drive 10 includes a magnetic disk 13 storing magnetic information and driven for rotation by a spindle motor, and a magnetic head slider 1 supporting a write/read element, supported on a suspension 15 and radially moved for positioning. The magnetic head slider 1 moves relative to the magnetic disk 13 to write magnetic information to and to read magnetic information from the magnetic disk 13. The magnetic head slider 1 is caused to fly over the magnetic disk 13 by the wedge effect of an air film serving as a pneumatic bearing so that the magnetic head slider may not directly come into solid-contact with the magnetic disk. The reduction of the distance between the magnetic slider 1 and the magnetic disk 13, namely, the flying height of the slider 1, and the increase of the track recording density are effective in increasing the capacity of the magnetic disk drive 10 through the increase of recording density in which the magnetic disk drive 10 records information and in reducing the size of the magnetic head drive 10. In recent years, the flying height of the slider is on the order of 10 nm or not greater than 10 nm.

The magnetic head slider 1 is attached to a gimbals made from a thin sheet and attached to a loading beam made from a plate spring and forming the suspension 5. The assembly of the magnetic head slider 1 and the suspension 15 is called a head gimbals assembly. The loading beam presses the magnetic head slider 1 toward the magnetic disk. A voice coil motor 16 drives the suspension 15 to move the write/read element radially relative to the magnetic disk 13 for a seek operation. The write/read element writes/reads information to/from the magnetic disk 13. The magnetic head slider 1 is retracted from a position above the magnetic disk 13 to a position on a ramp 14 while the magnetic disk drive 10 is not in operation or a write command is not give to the magnetic disk drive 10 for a predetermined time. Although the magnetic disk drive 10 shown in FIG. 2 is provided with a loading/unloading mechanism, the magnetic head drive 10 may be of a contact start/stop type in which the magnetic head slider 1 is held in a predetermined region while the magnetic disk drive 10 is inoperative.

Figure 3:
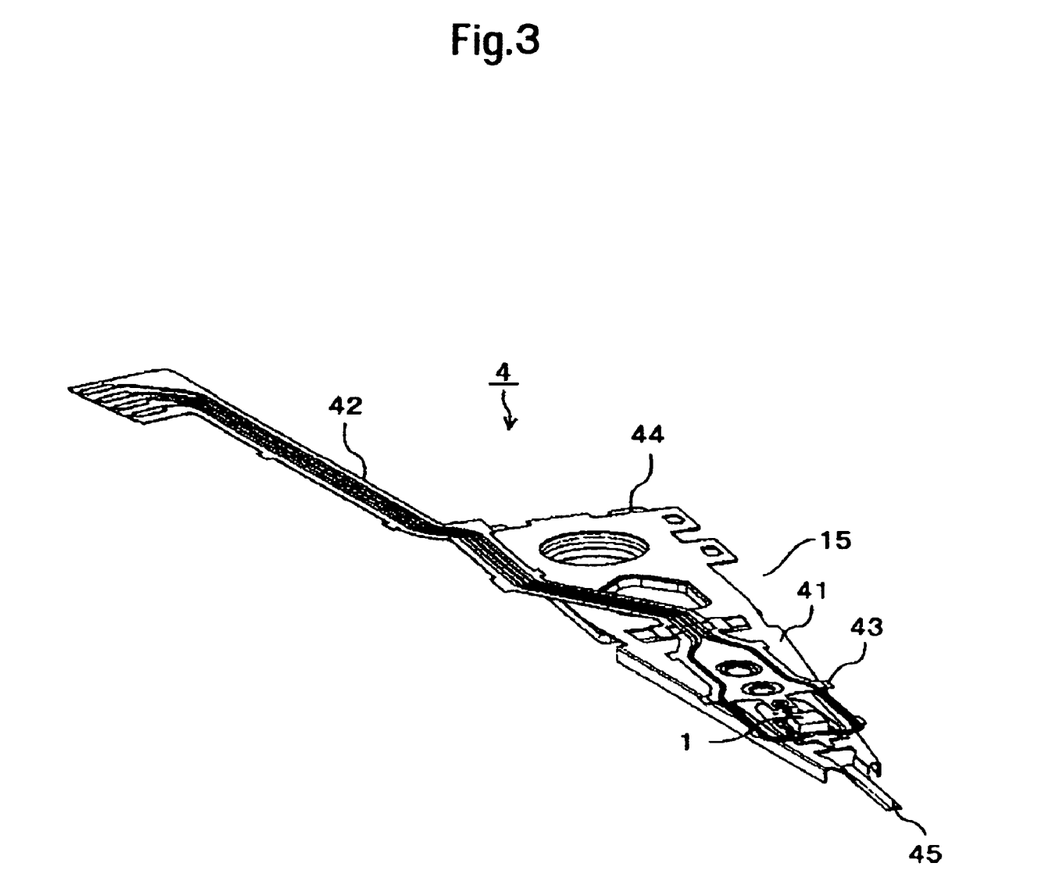
FIG. 3 is a perspective view of a head gimbals assembly according to an embodiment of the present invention.

FIG. 3 shows the head gimbals assembly (HGA) 4. The head gimbals assembly 4 includes the magnetic head slider 1, the suspension 15, and wiring lines 42 extended on the suspension 15. The suspension 15 includes a gimbals 43 holding the magnetic head slider 1 opposite to the magnetic disk 13, and the loading beam 41 holding the gimbals 43 opposite to the magnetic disk 13 and pressing the magnetic head slider 1 toward the magnetic disk 13. The loading beam 41 is provided at one end thereof with a mounting plate 44. The HGA 4 shown in FIG. 3 is a load/unload type head gimbals assembly. The loading beam 41 is provided at its free end with a tab 45 to be rested on the ramp 14 when the loading beam 41 is retracted. An outer end of the magnetic head slider 1 on the side of the tab 45 is provided with a plurality of terminals. The terminals are connected to the wiring lines 42 by soldering or ball bonding.

Figure 4:
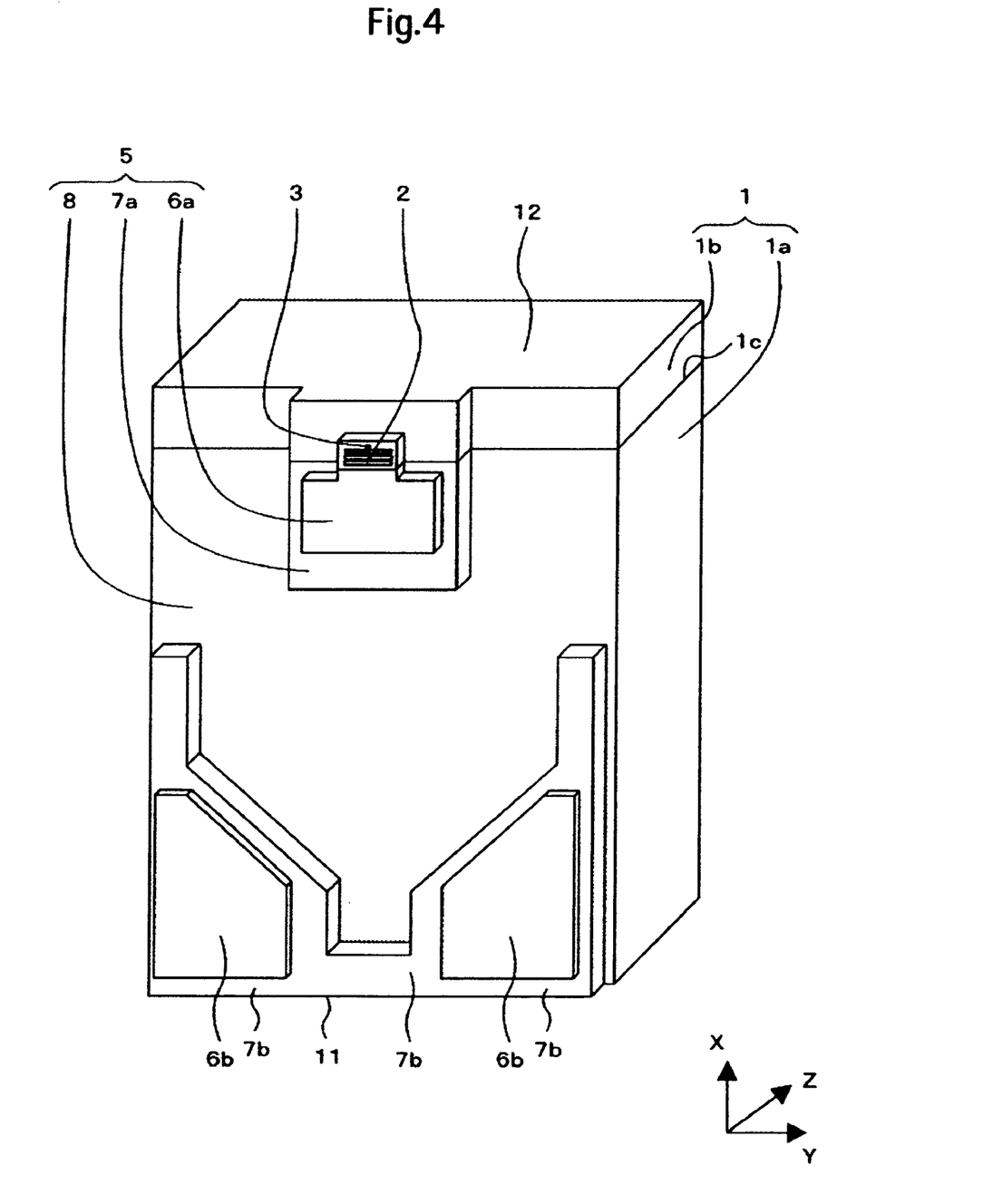
FIG. 4 is a perspective view of a magnetic head slider in a first embodiment according to the present invention.

FIG. 4 shows the magnetic head slider 1 according to a first embodiment of the present invention. The magnetic head slider 1 includes a substrate 1a (slider 1a) made of sintered alumina-titanium carbide (AlTiC: $Al_2O_3$—TiC), and a thin-film head unit 1b formed on a device forming surface 1c of the slider 1a. A wafer is subjected to processes including a sputtering process, a plating process and a polishing process to form the thin-film head unit 1b on the device forming surface 1c of the substrate 1a. The wafer is cut by dicing into bar-shaped blocks, the blocks are processed by a predetermined process and then each of the blocks are cut into a plurality of magnetic head sliders 1. The magnetic head slider 1 has a shape substantially resembling, for example, a rectangular solid of 1.25 mm in length, 1.0 mm in width and 0.3 mm in thickness. The magnetic head slider 1 has six surfaces, i.e., an air bearing surface 5, an air inflow end surface 11, an air outflow end surface 12, opposite side surfaces and a back surface. In some cases, the slider is smaller than that mentioned above and is 0.85 mm in length, 0.7 mm in width and 0.23 mm in thickness.

Fine lands (step bearings) are formed in the air bearing surface 5 by a process, such as an ion milling process or an etching process. The air bearing surface 5 faces the magnetic disk. Air pressure is produced between the air bearing surface 5 and the magnetic disk to counterbalance a load placed on the back surface. The air bearing surface 5 is divided into three types of surfaces, namely, rail surfaces 6 (6a and 6b) nearest to the magnetic disk, low surfaces 7 (7a and 7b) lower than the rail surfaces 6 by a depth between about 100 and about 200 nm, and a deep surface 8 lower than the rail surfaces 6 by about 1 μm. When air currents produced by the rotating magnetic disk flow through a convergent passage from the low surfaces 7b on the side of the air inflow end surface 11 to the rail surfaces 6b, air is compressed and a positive air pressure is produced in the convergent passage. Air currents flow through a divergent passage from the rail surface 6b and the low surfaces 7b to the deep surface 8 and a negative air pressure is produced in the divergent passage.

The magnetic head slider 1 is designed such that the flying height of an end part on the side of the air inflow end surface 11 is higher than that of an end part on the side of the air outflow end surface 12. Therefore, the rail surface 6a near the air outflow end surface 12 is the closest to the magnetic disk. The rail surface 6a protrudes from the rail surface 7a surrounding the rail surface 6a and protruding from the rail surface 8. Therefore, the rail surface 6a comes closest to the disk unless the magnetic head slider 1 tilts beyond a predetermined limit pitching position and a predetermined limit rolling position. The read element 2 and the write element 3 are formed in the thin-film head unit 1b on the rail surface 6a.

The bearing surfaces are designed such that the load placed by the loading beam 41 on the magnetic head slider 1 and the positive and negative air pressures generated at the air bearing surface 5 balance each other so as to hold the read element 2 and the write element 3 at a proper height on the order of 10 nm or not greater than 10 nm. Although the magnetic head slider 1 has the two-step air bearing surface 5 having the substantially parallel surfaces 6, 7 and 8, the magnetic head slider 1 may have a three-step air bearing surface having four parallel surfaces or a multiple-step air bearing surface having more than four parallel surfaces.

Figure 1:
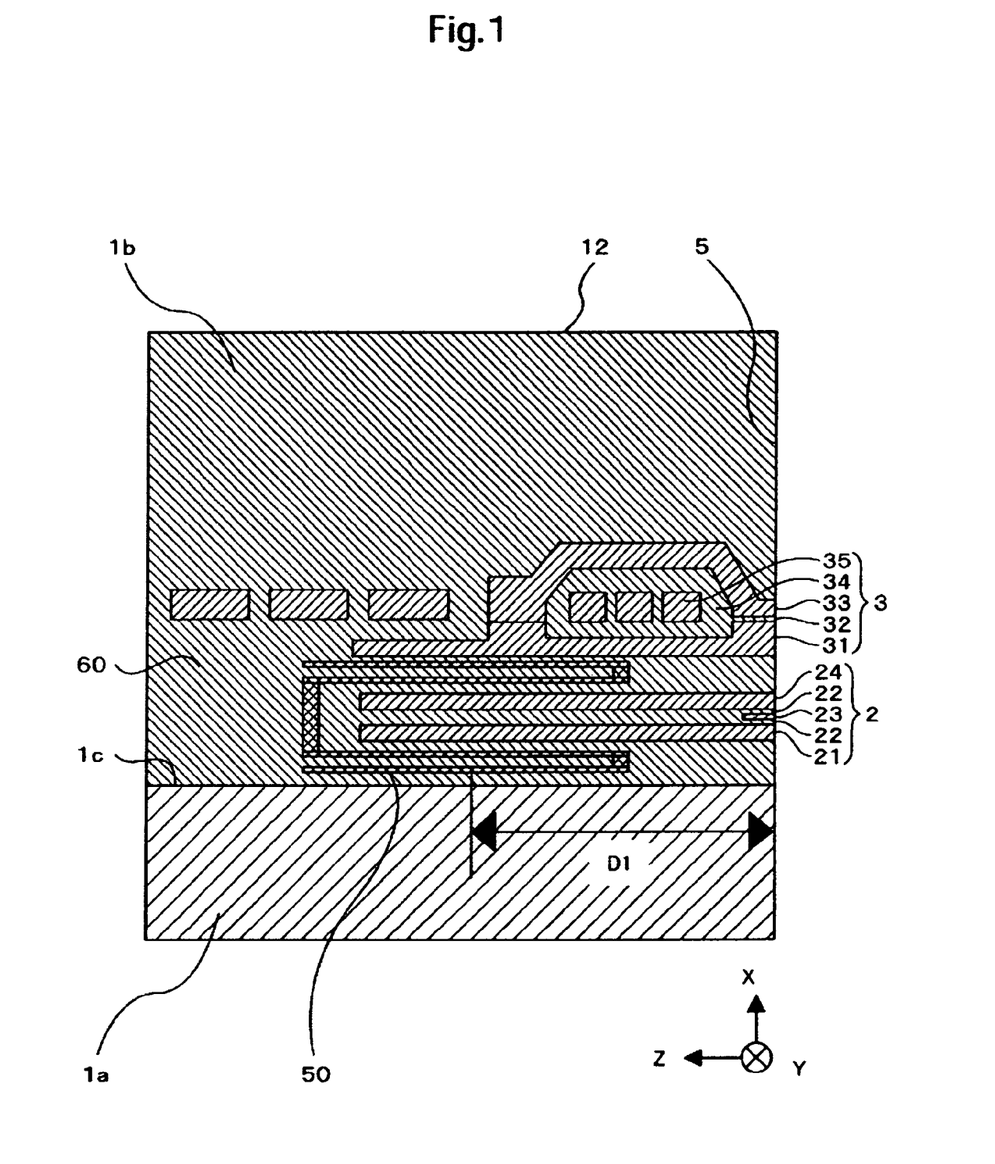
FIG. 1 is a sectional view of a thin-film head unit of a magnetic head slider in a first embodiment according to the present invention.
Figure 5:
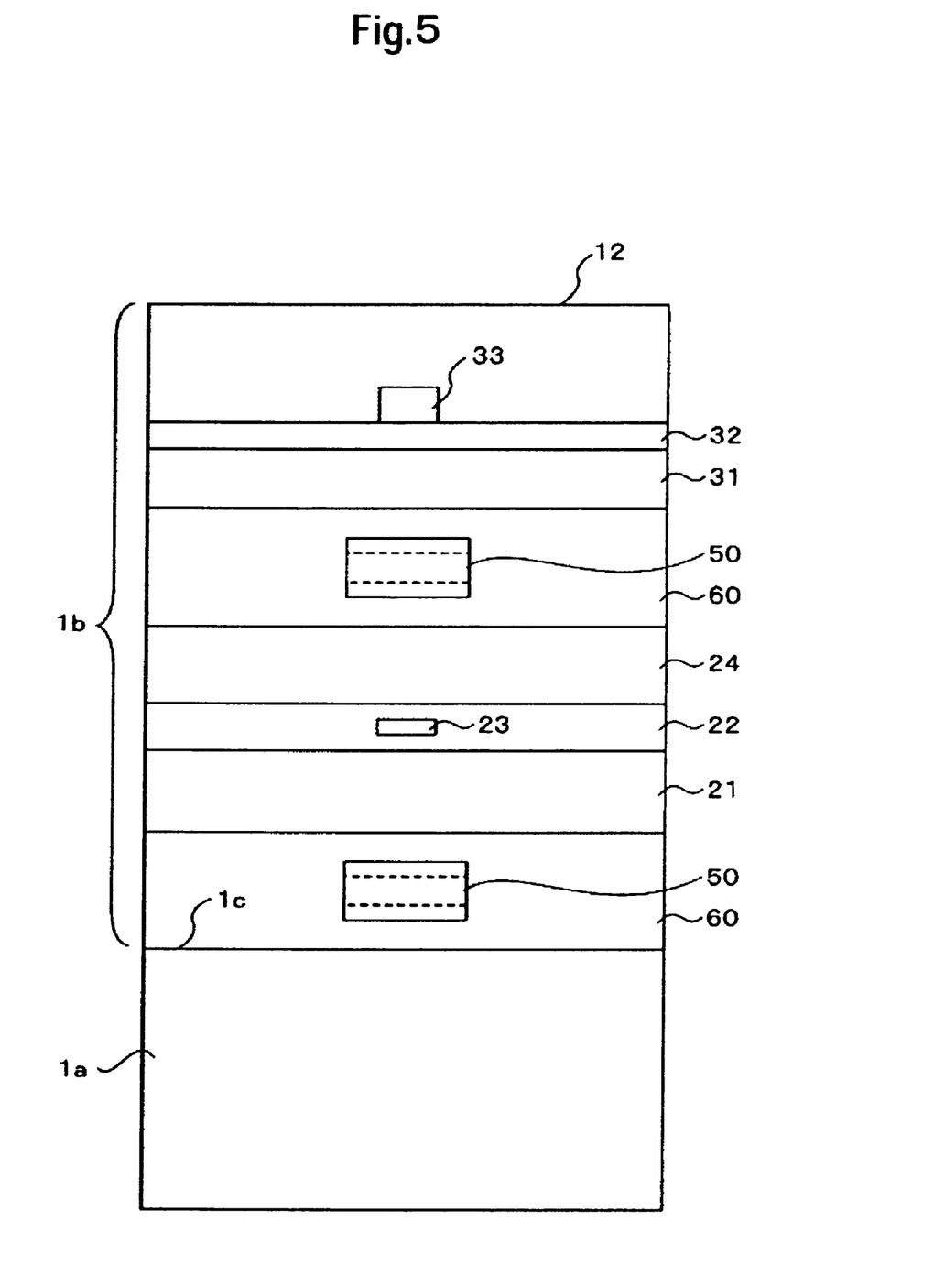
FIG. 5 is a view of a thin-film head unit included in the magnetic head slider in the first embodiment taken from the side of an air bearing surface.

FIG. 1 is a sectional view of the thin-film unit 1b of the magnetic head slider 1. FIG. 5 is a view of the thin-film head unit 1b taken from the side of the air bearing surface 5. Referring to FIGS. 1 and 5, the thin-film head unit 1b formed on the device forming surface 1c of the substrate 1a made of AlTiC of the magnetic head slider 1 includes the read element 2, a heater 50 extending on the upper and the lower side of the read element 2, the write element 3, an insulating layer 60 of, for example, alumina ($Al_2O_3$) insulating the read element 2, the write element 3 and the heater 50 and wiring lines, not shown, connected to those devices. The read element 2 includes a lower magnetic shield 21, spacing layer 22, a magnetoresistive element 23 embedded in the spacing layer 22, and an upper magnetic shield 24. The magnetoresistive element 23 is a GMR (giant magnetoresistive element) or a TMR (tunneling magnetoresistive element). The write element 3 includes a lower magnetic pole 31, a magnetic gap 32 on the side of the air bearing surface, an upper magnetic pole 33 having a back part magnetically coupled with the lower magnetic pole 31, and a coil 35 formed in a layer insulating layer 34 between the lower magnetic pole 31 and the upper magnetic pole 33. The heater 50 has a thin heating line formed by processing a thin film of NiCr or the like. The thin heating line of the heater 50 is extended in a zigzag shape on the upper and the lower side of the read element 2 with respect to a direction perpendicular to the device forming surface 1c (a direction in which the write element 3 is stacked). In this embodiment, the thin heating line of the heater 50 is folded back once in a region between the device forming surface 1c and the read element 2 and is folded back once in a region between the read element 2 and the write element 3. The thin heating line has a thickness between 0.1 and 0.2 μm and a width between 1 and 3 μm and a length of about 100 μm, and has a resistance between 50 and 500 Ω. In FIGS. 1 and 5, the magnetic head slider 1 is enlarged in a direction parallel to the length of the slider, namely, the X-direction in FIG. 1, to facilitate understanding the construction of the magnetic head slider 1.

Whereas the zigzag heater 122 shown in FIG. 13 meanders in the direction of the width of the slider (the Y-direction in FIG. 12) in a zigzag shape, the heater 50 of this embodiment meanders in the direction of the length of the slider, namely, a direction perpendicular to the device forming surface 1c of the slider base 1a, (the X-direction in FIG. 1) in a zigzag shape. The thin heating line is extended so as to meander in a direction perpendicular to the device forming surface 1c of the slider base 1a to form the heater 50 in an area having a small size with respect to the wide of the slider. Therefore, an area of the heater 50 corresponding to the slider base 1a having a high thermal conductivity is very small as compared with that in the known heater and hence it is difficult for heat generated by the heater 50 to be transferred to the slide base 1a. Consequently, heat generated by the heater 50 is concentrated in the vicinity of the read element and the thermal protrusion is increased. Since the heater 50 generates heat in a small area, a sharp protrusion is formed. The sharp protrusion suppresses the increase of an additional air pressure produced by the protrusion and an additional flying height caused by the protrusion is small. Consequently, power consumption can be reduced because the flying height changing efficiency of the protrusion in the magnetic head slider in this embodiment provided with heater 50 is higher than that in the known magnetic head slider provided with the known heater.

Figure 6:
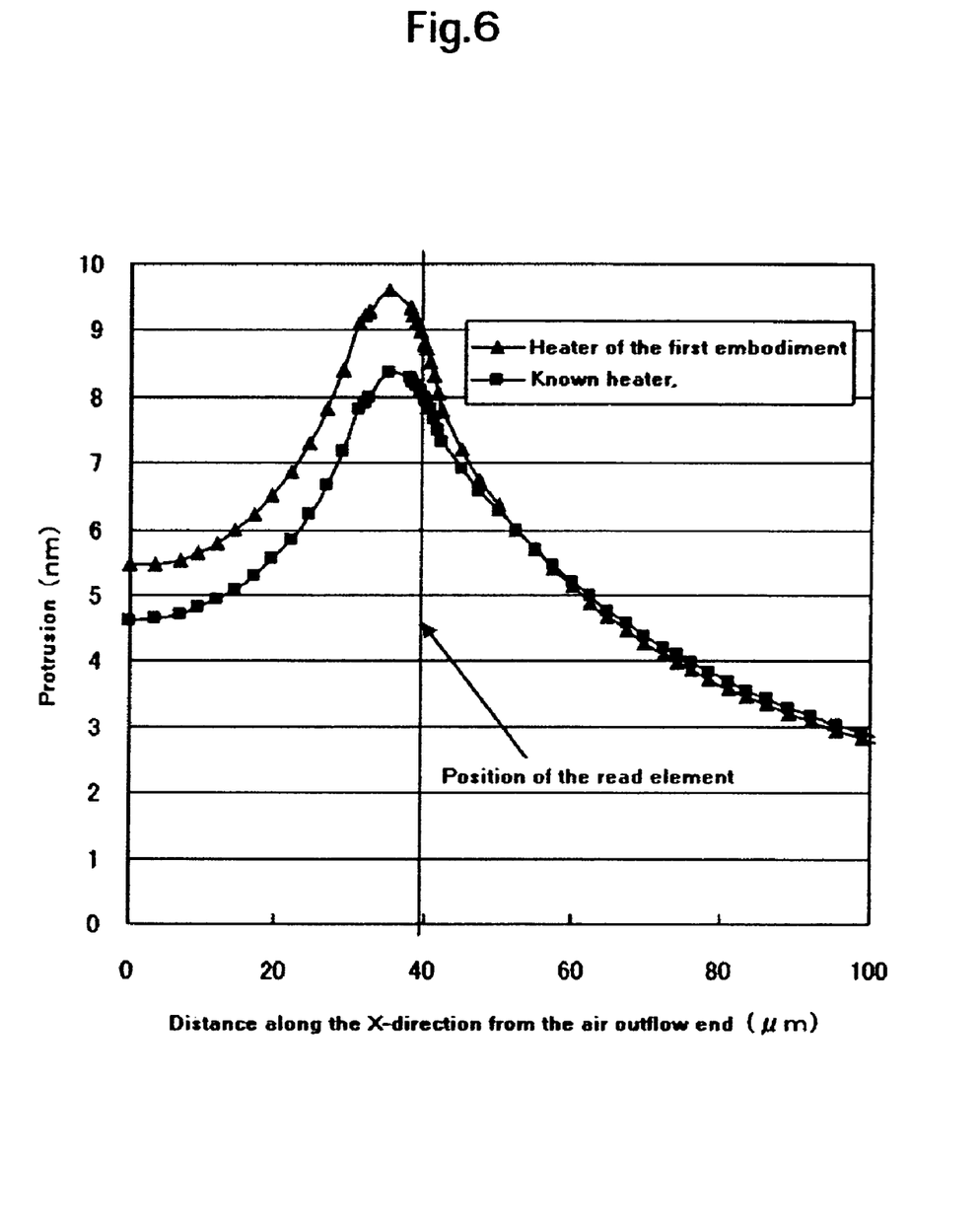
FIG. 6 is a graph of assistance in explaining the protrusion increasing effect of the first embodiment.
Figure 7:
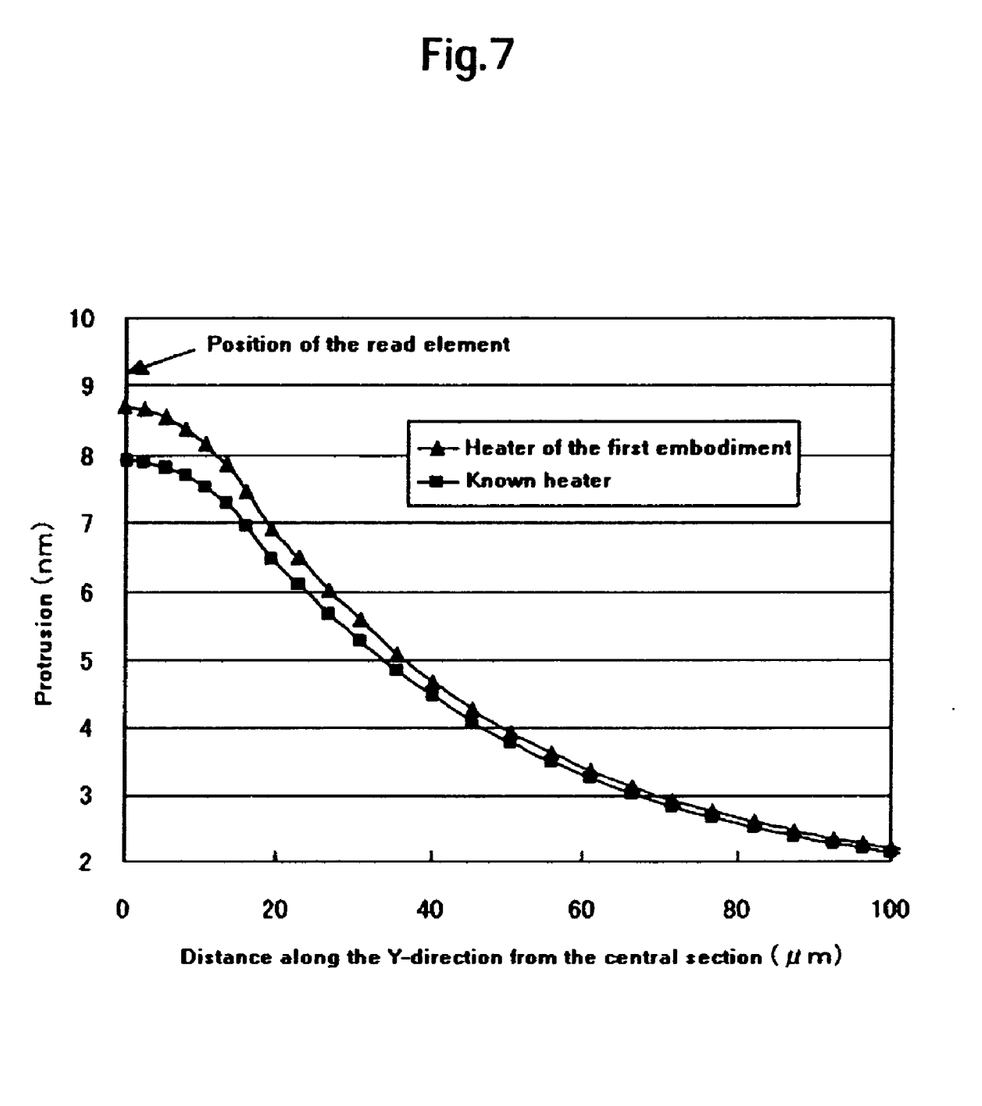
FIG. 7 is a graph of assistance in explaining the protrusion increasing effect of the first embodiment.
Figure 8:
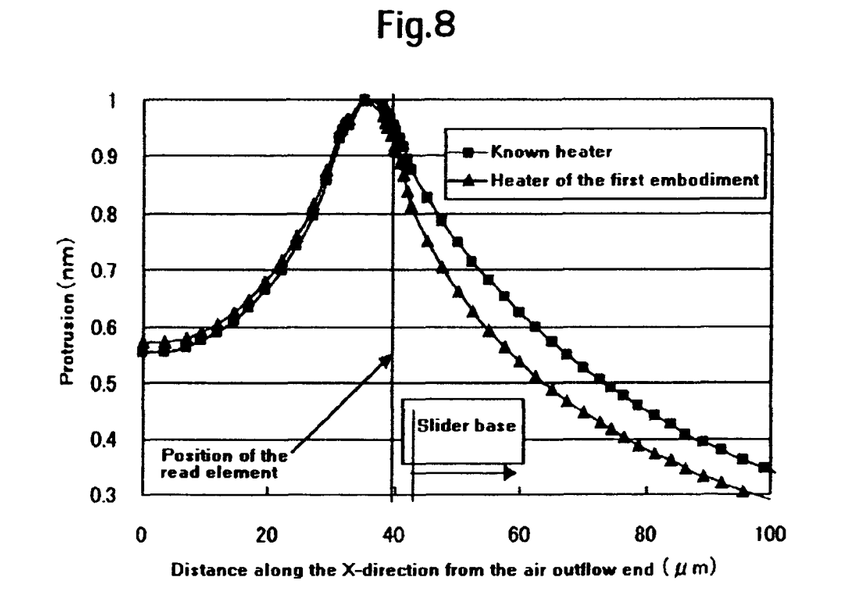
FIG. 8 is a graph of assistance in explaining the protrusion sharpening effect of the first embodiment.
Figure 9:
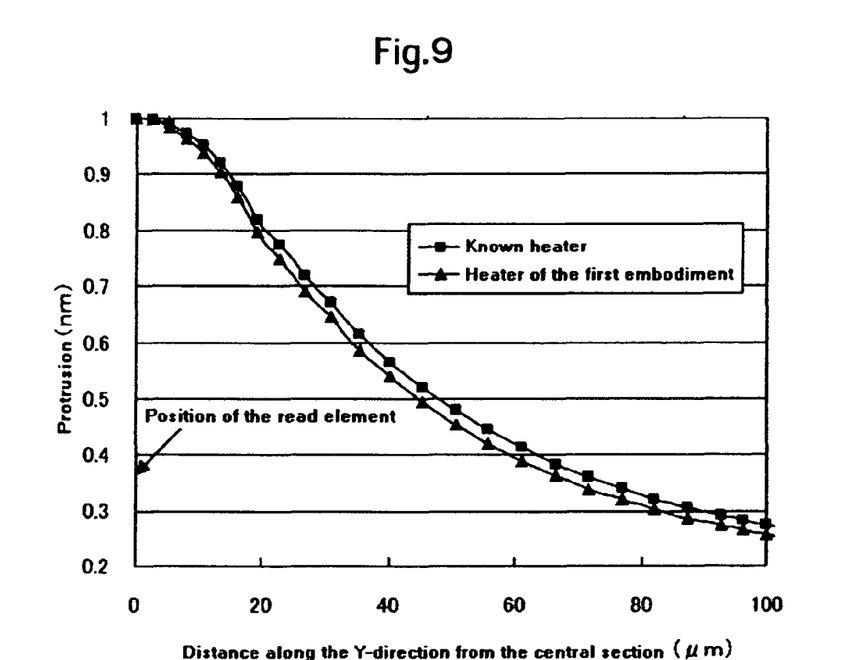
FIG. 9 is a graph of assistance in explaining the protrusion sharpening effect of the first embodiment.

Thermal deformations in the slider heated by the heater 50 and thermal deformations in the slider heated by the known heater when power of 50 mW was supplied to the heaters determined through analysis by a finite element method are shown comparatively in FIGS. 6 and 7. To analyze the effects of the two heaters under the same conditions, the respective centers of the heaters 122 and 50 were supposed to be at the same distance D1 from the corresponding air bearing surfaces. FIG. 6 shows the mode of deformation of a part around the write/read element with respect to the length of the slider. In FIG. 6, the distance of the position of the read element for the air outflow end is measured on the horizontal axis and the projection of the part around the write/read element is measured on the vertical axis. FIG. 7 shows the mode of deformation on the part around the write/read element with respect to a radial direction. In FIG. 7, the distance of the position of the read element from the middle of the width of the slider is measured on the horizontal axis and the project of the part around the write/read element is measured on the vertical axis. It is know from the results of analysis shown in FIGS. 6 and 7 that the projection formed by the heat generated by the heater 50 of this embodiment is greater than that formed by the heat generated by the known heater. Shapes of the projections are shown comparatively in FIGS. 8 and 9. It is known from FIGS. 8 and 9 that the deformation of the slider base 1a heated by the heater 50 is smaller than that heated by the known heater, and the projection caused by the heat generated by the heater 50 is sharper than that caused by the heated generated by the known heater.

Figure 10:
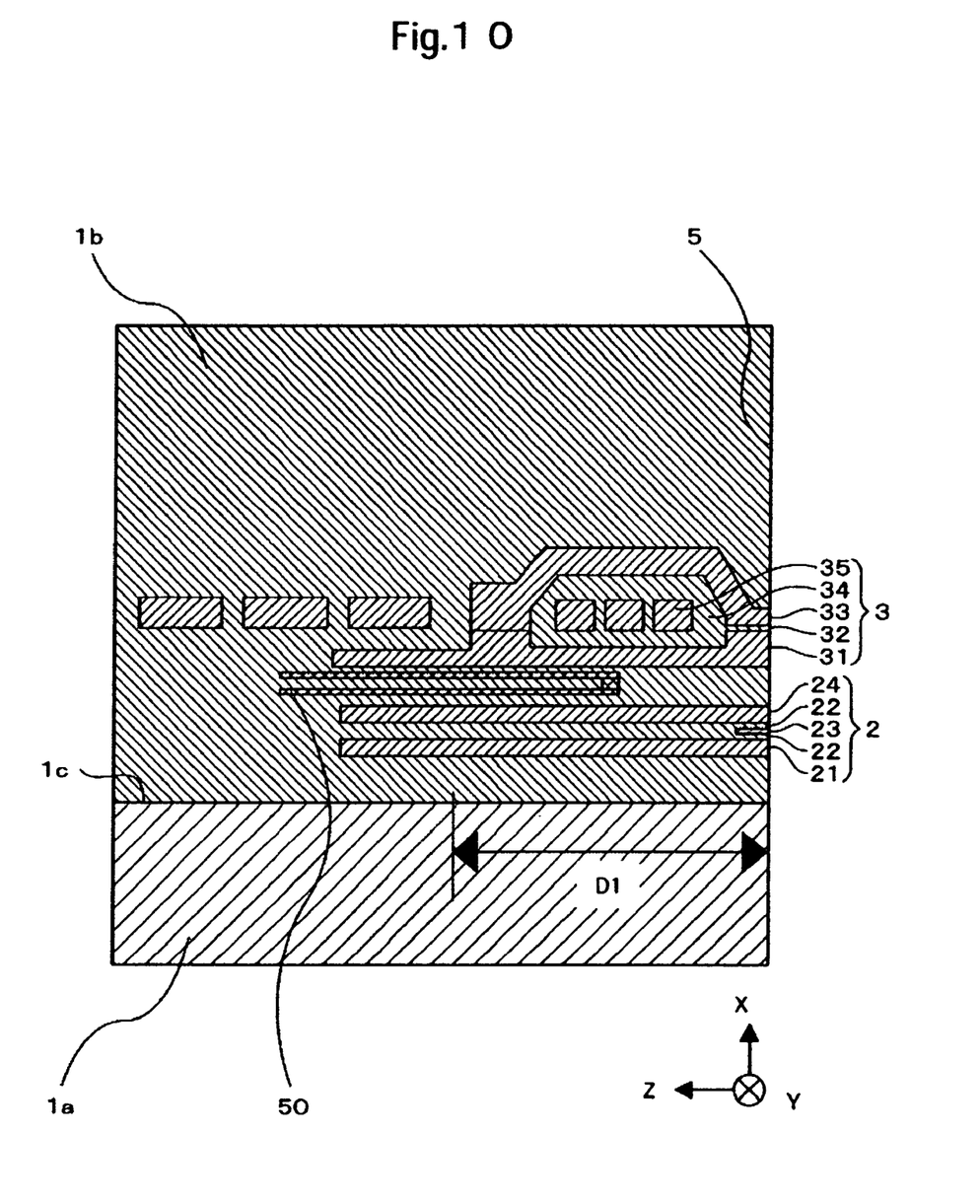
FIG. 10 is a sectional view of a thin-film head unit included in a magnetic head slider according to a second embodiment of the present invention.

FIG. 10 is a sectional view of a thin-film unit 1b of a magnetic head slider 1 according to a second embodiment of the present invention. The magnetic head slider 1 in the second embodiment is the same in basic construction as the magnetic head slider 1 in the first embodiment. In the second embodiment, a heater 50 is formed between an upper magnetic shield 24 and a lower magnetic pole 31 so as to meander in the direction of the length of the slider (the X-direction in FIG. 10) in a zigzag shape. The effect of the heater 50 is the same as that of the heater 50 of the first embodiment, and construction of the heater 50 of the second embodiment is simple.

Figure 11:
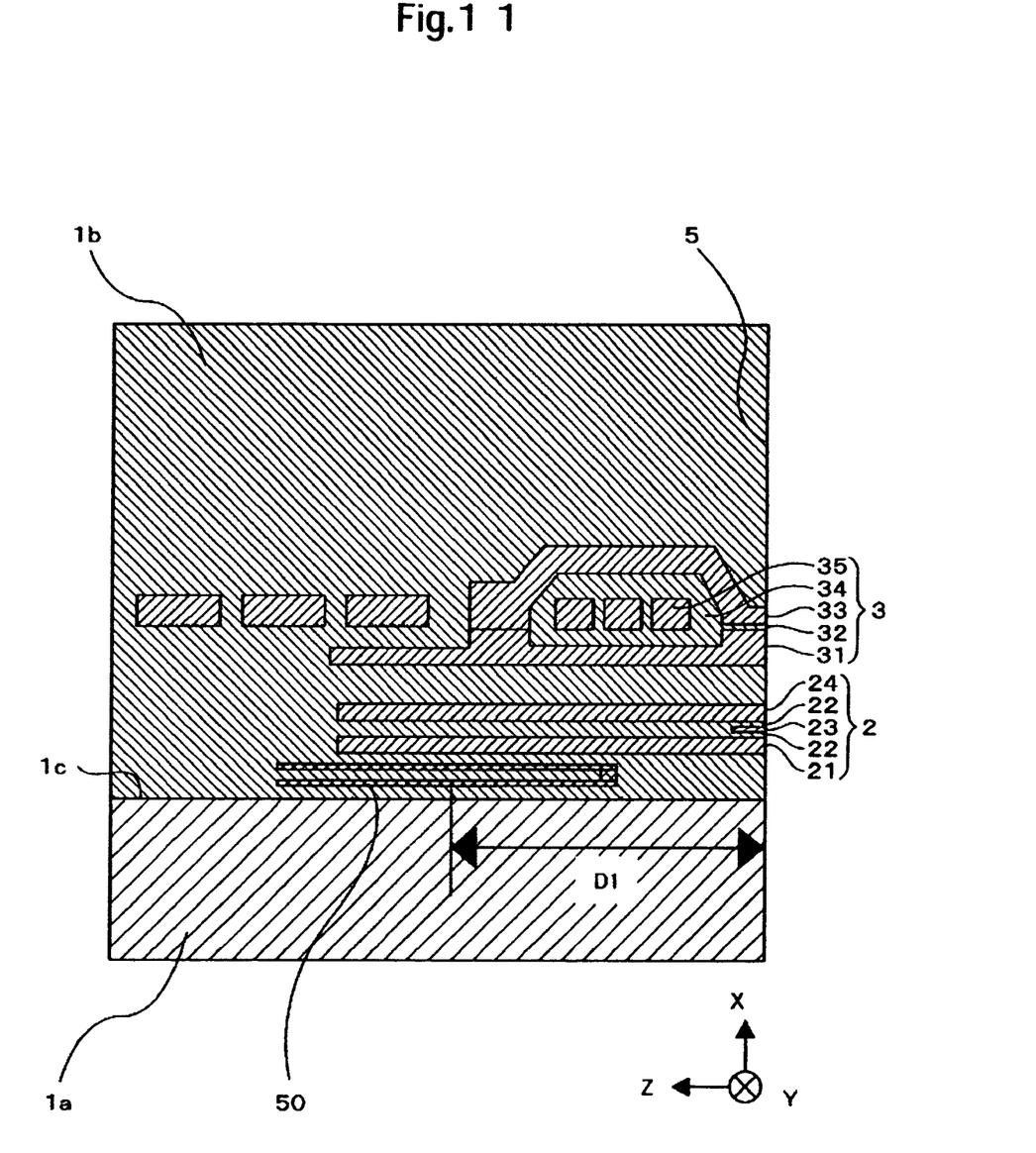
FIG. 11 is a sectional view of a thin-film head unit included in a magnetic head slider according to a third embodiment of the present invention.

FIG. 11 is a sectional view of a thin-film unit 1b of a magnetic head slider 1 in a third embodiment according to the present invention. The magnetic head slider 1 in the third embodiment is the same in basic construction as the magnetic head slider 1 in the first embodiment. In the third embodiment, a heater 50 is formed between a slider base 1a and a lower magnetic shield 21 so as to meander in the direction of the length of the slider (the X-direction in FIG. 11) in a zigzag shape. The effect of the heater 50 is the same as that of the heater 50 of the first embodiment, and construction of the heater 50 of the third embodiment is simple.

What is claimed is:

1. A magnetic head slider comprising:
a slider base;
a read element formed on a device forming surface of the slider base;
a write element formed on the read element; and
a heater formed near the read element and having a thin heating line of a thin resistive film meandering in a direction in which the write element is stacked in a zigzag shape,
wherein the thin heating line of the thin resistive film extends above and below the read element.

2. The magnetic head slider according to claim 1, wherein the heater is formed between the device forming surface of the slider base and the read element.

3. The magnetic head slider according to claim 1, wherein the heater is formed between the read element and the write element.

4. The magnetic head slider according to claim 1, wherein the thin heating line of the thin resistive film has a thickness between about 0.1 and 0.2 μm, and a width between 1 and 3 μm.

5. The magnetic head slider according to claim 1, wherein the thin heating line of the thin resistive film has a thickness between 0.1 and 0.2 μm, a width between 1 and 3 μm and a length of about 100 μm.

6. The magnetic head slider according to claim 1, wherein the thin heating line of the thin resistive film has a thickness between 0.1 and 0.2 μm, a width between 1 and 3 μm and a resistance between about 50 and about 500 Ω.

7. The magnetic head slider according to claim 1, wherein the read element has a lower magnetic shield, an upper magnetic shield, and a magnetoresistive element formed in a spacing layer between the lower magnetic shield and the upper magnetic shield, and the thin heating line of the thin resistive film is extended between the device forming surface of the slider base and the lower magnetic shield and between the upper magnetic shield and the write element.

8. The magnetic head slider according to claim 1, wherein the read element has a lower magnetic shield, an upper magnetic shield, and a magnetoresistive element formed in a spacing layer between the lower magnetic shield and the upper magnetic shield, and the thin heating line of the thin resistive film is extended between the device forming surface of the slider base and the lower magnetic shield.

9. The magnetic head slider according to claim 1, wherein the read element has a lower magnetic shield, an upper magnetic shield, and a magnetoresistive element formed in a spacing layer between the lower magnetic shield and the upper magnetic shield, and the thin heating line of the thin resistive film is extended between the upper magnetic shield and the write element.

10. A magnetic head slider comprising:
a slider base;
a read element formed on a device forming surface of the slider base;
a write element formed on the read element; and
a heater formed near the read element and having a thin heating line of a thin resistive film meandering in a zigzag shape in a direction perpendicular to the device forming surface, wherein the thin heating line of the thin resistive film extends above and below the read element.

11. A head gimbals assembly comprising:

a magnetic head slider;

a flexible gimbals holding the magnetic head slider; and a loading beam supporting the gimbals and loading the magnetic head slider;

wherein the magnetic head slider includes: a slider base, a read element formed on a device forming surface of the slider base, a write element formed on the read element, and a heater formed near the read element and having a thin heating line of a thin resistive film meandering in a zigzag shape in a direction in which the write element is stacked, wherein the thin heating line of the thin resistive film extends above and below the read element.

12. The head gimbals assembly according to claim 11, wherein the heater is formed between the device forming surface of the slider base and the read element.

13. The head gimbals assembly according to claim 11, wherein the heater is formed between the read element and the write element.

* * * * *